United States Patent
Lee et al.

(10) Patent No.: US 9,577,277 B2
(45) Date of Patent: Feb. 21, 2017

(54) LIQUID DRUM TYPE FUEL CELL-METAL RECOVERY APPARATUS

(71) Applicant: GWANGJU INSTITUTE OF SCIENCE AND TECHNOLOGY, Gwangju (KR)

(72) Inventors: Jaeyoung Lee, Gwangju (KR); HyungKuk Ju, Gwangju (KR); Jae Kwang Lee, Gwangju (KR)

(73) Assignee: GWANGJU INSTITUTE OF SCIENCE AND TECHNOLOGY, Gwangju (KR)

( * ) Notice: Subject to any disclaimer, the term of this patent is extended or adjusted under 35 U.S.C. 154(b) by 300 days.

(21) Appl. No.: 14/451,543

(22) Filed: Aug. 5, 2014

(65) Prior Publication Data

US 2015/0044598 A1  Feb. 12, 2015

(30) Foreign Application Priority Data

Aug. 8, 2013 (KR) .................. 10-2013-0094379

(51) Int. Cl.

| | |
|---|---|
| H01M 8/22 | (2006.01) |
| H01M 8/12 | (2016.01) |
| H01M 8/24 | (2016.01) |
| H01M 8/10 | (2016.01) |
| H01M 4/90 | (2006.01) |
| H01M 4/86 | (2006.01) |
| H01M 8/00 | (2016.01) |

(52) U.S. Cl.
CPC ......... *H01M 8/1009* (2013.01); *H01M 4/8626* (2013.01); *H01M 4/8657* (2013.01); *H01M 4/9025* (2013.01); *H01M 8/004* (2013.01); *H01M 8/1233* (2013.01); *H01M 8/225* (2013.01); *H01M 8/243* (2013.01); *H01M 8/247* (2013.01); *H01M 8/2455* (2013.01); *Y02E 60/521* (2013.01); *Y02E 60/525* (2013.01)

(58) Field of Classification Search
None
See application file for complete search history.

(56) References Cited

U.S. PATENT DOCUMENTS

| | | | |
|---|---|---|---|
| 2011/0014526 A1* | 1/2011 | Gur ..................... | H01M 8/0643 429/405 |
| 2016/0064742 A1* | 3/2016 | Chuang ............... | H01M 8/1246 429/405 |
| 2016/0156056 A1* | 6/2016 | Gorte .................. | H01M 8/0656 429/454 |

* cited by examiner

*Primary Examiner* — Jonathan Crepeau
(74) *Attorney, Agent, or Firm* — Hauptman Ham, LLP

(57) ABSTRACT

Disclosed herein is a liquid drum type fuel cell-metal recovery apparatus, which can produce power through electrochemical oxidation of coal by continuously receiving coal/metal oxide mixed particles.

13 Claims, 5 Drawing Sheets

FIG. 2

<Coal fuel cell reaction-power generation>
$C + 2O^{2-} \rightarrow CO_2 + 4e^-$ (exothermic)
$C + O^{2-} \rightarrow CO + 2e^-$ (exothermic)
$CO + O^{2-} \rightarrow CO_2 + 2e^-$ (endothermic)
Overall reaction is exothermic <Metal recovery reaction>
$Me_xO_y + C \rightarrow xMe + CO$ or $CO_2$
$Me_xO_y + CO \rightarrow xMe + CO_2$ <Upon operation of metal fuel cell>
$Me + 2O^{2-} \rightarrow MeO_2 + 4e^-$
$Me + O^{2-} \rightarrow MeO + 2e^-$

LIQUID DRUM TYPE FUEL CELL-METAL RECOVERY APPARATUS

CROSS-REFERENCE TO RELATED APPLICATION

This application claims priority to Korean Patent Application No. 10-2013-0094379 filed on 8 Aug. 2013, and all the benefits accruing therefrom under 35 U.S.C. §119, the contents of which is incorporated by reference in its entirety.

BACKGROUND

1. Technical Field

The present invention relates to a liquid drum type fuel cell-metal recovery apparatus.

2. Description of the Related Art

A fuel cell refers to a device that converts chemical energy into electrochemical energy, and can be continuously operated by continuously receiving a gaseous or liquid fuel, such as hydrogen and ethanol, unlike an energy storage device such as a battery.

The fuel cell has been developed in various forms and structures, such as proton exchange membrane fuel cells (PEMFCs), phosphoric acid fuel cells (PAFCs), molten carbonate fuel cells (MCFCs), solid oxide fuel cells (SOFCs), direct carbon fuel cells (DCFCs), and the like.

Among these fuel cells, the direct carbon/coal fuel cell, which can be referred to as a next generation fuel cell, is capable of obtaining energy through direct electrochemical oxidation of solid carbon fuel, biomass or the like without gasification or use of a reformer. The direct carbon fuel cell has a high thermodynamic energy conversion rate ($\eta th=\Delta G/\Delta H=$over 100%) incomparable with those of power generation systems or any other energy systems, and does not use external reformation or water unlike other types of fuel cells. In addition, the direct carbon fuel cell scarcely generates by-products, such as $NO_x$ and $SO_x$, and emits only $CO_2$ gas, which has high purity and is easily collected and reused.

Although carbon or coal, which is used as a fuel, is solid and thus has higher energy density than gaseous materials such as hydrogen, there is a drawback of difficult reaction between solid carbon particles and a solid fuel electrode (anode) catalyst at a three-phase boundary(TPB) at which solid carbon contacts a porous catalyst. In particular, coal is a heterogeneous conglomerate having an extremely complicated physicochemical properties, and is composed of about 10% to about 45% of water, about 45% of volatile materials and about 10% of minerals(ashes).

Thus, when coal is used as a fuel in practice, the fuel electrode catalyst of the direct carbon fuel cell is physically/chemically poisoned by various impurity ashes contained in coal, thereby causing a serious problem with inhibition of continuous electrochemical reaction.

Moreover, in typical metal recovery devices or pretreatment of coal fuels, metal or ashes is extracted or recovered using heat electric energy through a separate external system.

Therefore, there is a need for an apparatus that has improved durability against ashes or minerals, which are contained in coal and cause various problems in operation of the direct carbon fuel cell, and can recover reusable metal therefrom. This system can be operated as a highly complementary technology.

BRIEF SUMMARY

The present invention has been conceived to solve the problems in the art and it is an aspect of the present invention is to provide a liquid drum type fuel cell-metal recovery apparatus which can generate power through electrochemical oxidation of coal by continuously receiving coal/metal oxide mixed particles.

In accordance with one aspect of the present invention, a metal-reductive direct carbon fuel cell includes: (a) a housing; (b) at least one fuel inlet through which a mixture of a fuel and a metal oxide is injected into the housing; (c) at least one unit cell which has a cylindrical shape having an elongated hole formed therein in an axial direction and is rotatably disposed within the housing; (d) at least one gas inlet through which an oxygen-containing gas is injected into the hole from an outside of the housing; (e) at least one gas outlet through which carbon dioxide generated in the housing is discharged; (f) a liquid media filling at least a portion of an empty space within the housing; and (g) at least one metal outlet through which a metal reduced from the injected metal oxide by the unit cell is discharged from the housing.

According to the present invention, since the apparatus can generate electric power through electrochemical oxidation of coal by continuously receiving coal/metal oxide mixed particles, the metal oxide can be reduced to metal using the generated heat from the oxidation reaction and using the unreacted carbon particles at a fuel electrode or $CO/CO_2$ gas generated by electrochemical reaction of a coal fuel as a reductant, thereby achieving metal recovery. In addition, the apparatus can exhibit improved durability against ashes or minerals, which are contained in the coal fuel and cause problems upon actual operation of the direct carbon fuel cell, and can recover reusable metals therefrom.

BRIEF DESCRIPTION OF THE DRAWINGS

The above and other aspects, features, and advantages of the present invention will become apparent from the detailed description of the following embodiments in conjunction with the accompanying drawings, in which;

FIG. 2 shows reaction formulae regarding power generation through electrochemical reaction of a coal (carbon) fuel and one example of reaction for reducing a metal oxide or ash into a metal using carbon or CO gas as a reductant according to one embodiment of the present invention, in which the recovered metal can be used again as a fuel through electrochemical oxidation;

DETAILED DESCRIPTION

Hereinafter, various aspects and embodiments of the present invention will be described in detail with reference to the accompanying drawings.

In accordance with one aspect of the present invention, a metal-reductive direct carbon fuel cell include: (a) a housing; (b) at least one fuel inlet through which a mixture of a fuel and a metal oxide is injected into the housing; (c) at least one unit cell which has a cylindrical shape having an elongated hole formed therein in an axial direction and is rotatably disposed within the housing; (d) at least one gas inlet through which an oxygen-containing gas is injected into the hole from an outside of the housing; (e) at least one gas outlet through which carbon dioxide generated in the housing is discharged; (f) a liquid media filling at least a portion of an empty space within the housing; and (g) at least one metal outlet through which a metal reduced from the injected metal oxide by the unit cell is discharged from the housing.

Figure 1:
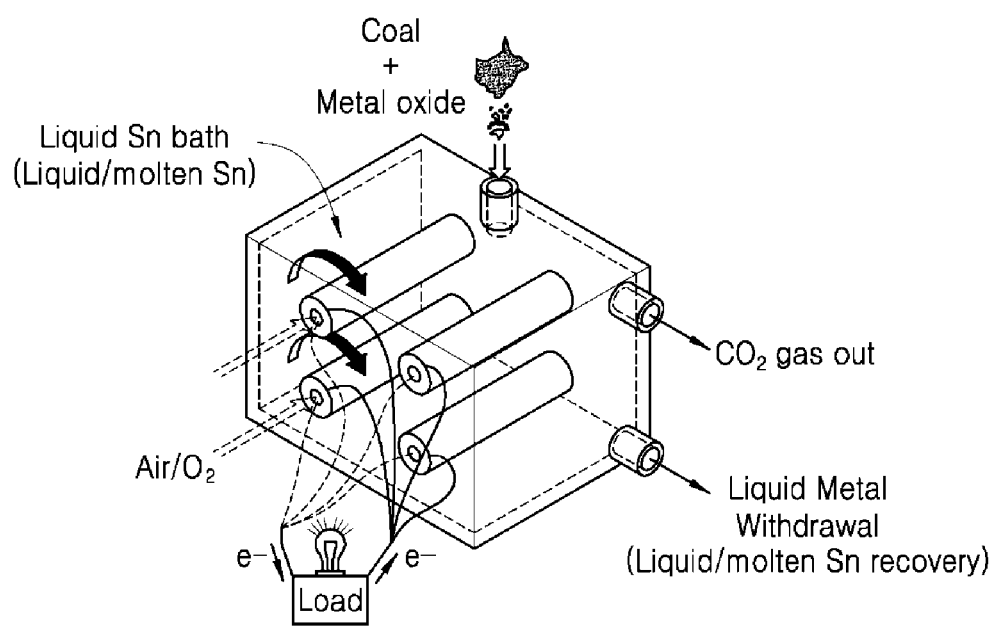
FIG. 1 is a schematic diagram of the overall structure of a liquid drum type fuel cell-metal recovery apparatus according to one embodiment of the present invention.

As shown in FIG. 1, the direct carbon fuel cell according to the present invention is a liquid drum system, and includes the housing and the at least one unit cell rotatably disposed within the housing. The unit cell has elongated inner holes formed from one side of the housing to the other side thereof in an axis direction, such that air, oxygen or a mixed gas thereof can pass through the inner hole.

In addition, the mixture of the fuel and the metal oxide is injected into the housing, and the fuel may be coal, without being limited thereto. Further, the direct carbon fuel cell includes the at least one outlet through which carbon dioxide generated in the housing is discharged, and the liquid media fills the housing. The liquid media may be molten tin. Furthermore, the direct carbon fuel cell includes the at least one metal outlet through which the metal reduced from the injected metal oxide is discharged.

As such, according to the present invention, there is a merit in that the direct carbon fuel cell permits power generation and metal recovery at the same time. That is, although a typical metal recovery apparatus must use heat or electric energy for extraction or recovery of metals, the direct carbon fuel cell according to the present invention enables power generation through electrochemical oxidation of coal by continuously supplying coal/metal oxide mixed particles into the apparatus. The metal oxide can be reduced into a metal using heat generated upon power generation and carbon particles unreacted at the fuel electrode or $CO/CO_2$ gas generated by electrochemical reaction of the coal fuel as a reductant.

In addition, the direct carbon fuel cell has improved durability against ashes or minerals, which are contained in the coal fuel and cause a problem upon actual operation thereof, and can recover reusable metals from the ash or minerals. Further, as shown in FIG. 2, since overall electrochemical reaction by the solid coal fuel is an exothermic reaction, the direct carbon fuel cell can also maintain operation temperature thereof and a liquid phase of the molten tin, and can supplement heat loss due to metal recovery.

In one embodiment, the unit cell includes: (c1) a fuel electrode formed on a surface thereof; (c2) an air electrode formed on a surface of the hole formed in the axial direction; (c3) a fuel electrode current collector contacting at least a portion of a surface of the fuel electrode; (c4) an air electrode current collector contacting at least a portion of a surface of the air electrode; and (c5) an external wire connecting the air electrode current collector to the fuel electrode current collector.

Figure 3:
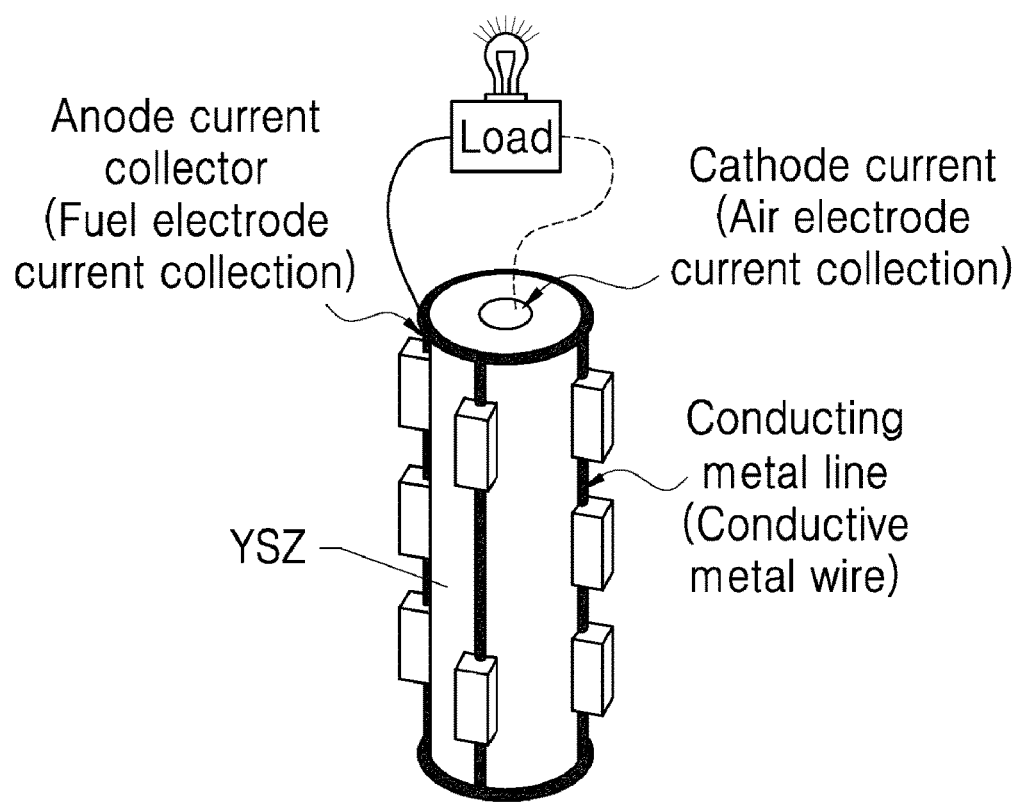
FIG. 3 is a schematic diagram of a tubular single cell including a protrusion-type fuel electrode according to one embodiment of the present invention.

That is, as shown in FIG. 3, the unit cell may be implemented in a tubular structure that includes the fuel electrode disposed on an outer surface thereof and the air electrode disposed on the inner hole, and may include the current collectors capable of collecting current at the fuel electrode and the air electrode, respectively, The unit cell may include the external wire that connects the two current collectors to each other.

In another embodiment, the fuel electrode current collector may include at least one conductive metal wire contacting the surface of the fuel electrode, and may be formed by plating the conductive wire on the surface of the fuel electrode.

In a further embodiment, the fuel electrode may include yttria-stabilized zirconia (YSZ), and may have a nanoscale thick $TiO_2$ or $V_2O_3$ layer formed on the surface thereof.

Figure 4:
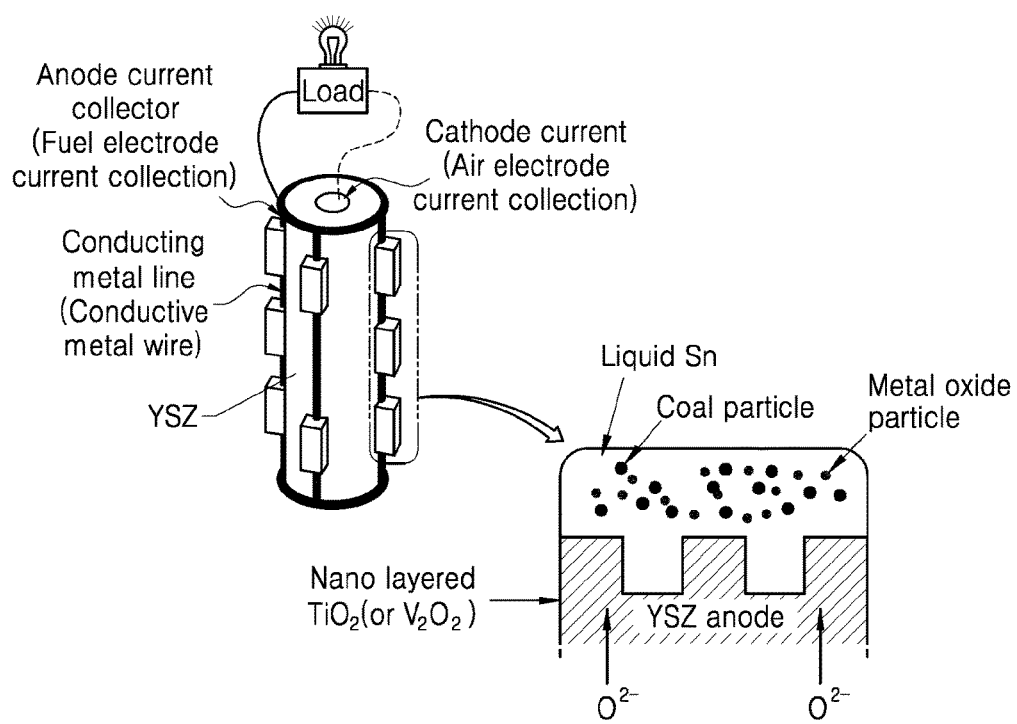
FIG. 4 is a schematic diagram of the protrusion-type fuel electrode having an increased reaction surface area for improvement of actual reactivity between solid coal (carbon) and metal oxide particles in the single cell of FIG. 3.

As shown in FIG. 4, to prevent poisoning of a tubular YSZ single cell and to protect ceramic YSZ, $TiO_2$ or $V_2O_3$, each of which is stable in the above reaction and is advantageous in oxygen ion transfer, may be formed.

In particular, a passivation layer may be coated to a thickness from 10 nm to 100 nm (for example, a thickness of 50 nm) using an atomic layer deposition (ALD) apparatus, and when $TiO_2$ or $V_2O_3$ is formed to a thickness from 10 nm to 100 nm through ALD, impurity poisoning can be significantly reduced, and the plated conductive metal wire might be stably attached to the YSZ electrode and maintained without separation therefrom even after a long operation time of 500 hours or more.

In yet another embodiment, the fuel electrode may include a plurality of protrusions on the surface thereof. The protrusions have a semielliptical or hexahedral shape by taking into account the particle sizes of solid coal (carbon) and the metal oxide. The protrusions may have a diameter of about 0.5 μm to about 2 μm, and a pitch of 50 μm to 100 μm. The protrusions may be formed to cover the conductive metal wire for stable attachment and maintenance of the conductive metal wire.

In yet another embodiment, the metal-reductive direct carbon fuel cell may further include an outlet through which the liquid media is discharged from the housing and an inlet through which the liquid media is injected again into the housing.

As such, the direct carbon fuel cell may further include a device for discharging the liquid media from the housing and then re-injecting the liquid media into the housing, thereby reducing consumption of liquid media.

In yet another embodiment, the fuel may include at least one solid fuel selected from among coal, coke, char and graphite; at least one liquid fuel selected from among gasoline, diesel, heavy oil and kerosene; or a mixture of the solid and liquid fuels.

In yet another embodiment, the fuel may be a solid fuel pulverized to a size from 0.1 μm to 5 μm. If the particle size of the solid fuel is out of this range, the fuel can suffer from significantly deterioration in reactivity. If the particle size of the solid fuel is within this range, mixing capability of the fuel with the liquid media such as molten tin might be maintained at almost the same level even after a long operation time of 500 hours without recirculation such as separate discharge/re-injection.

Figure 5:
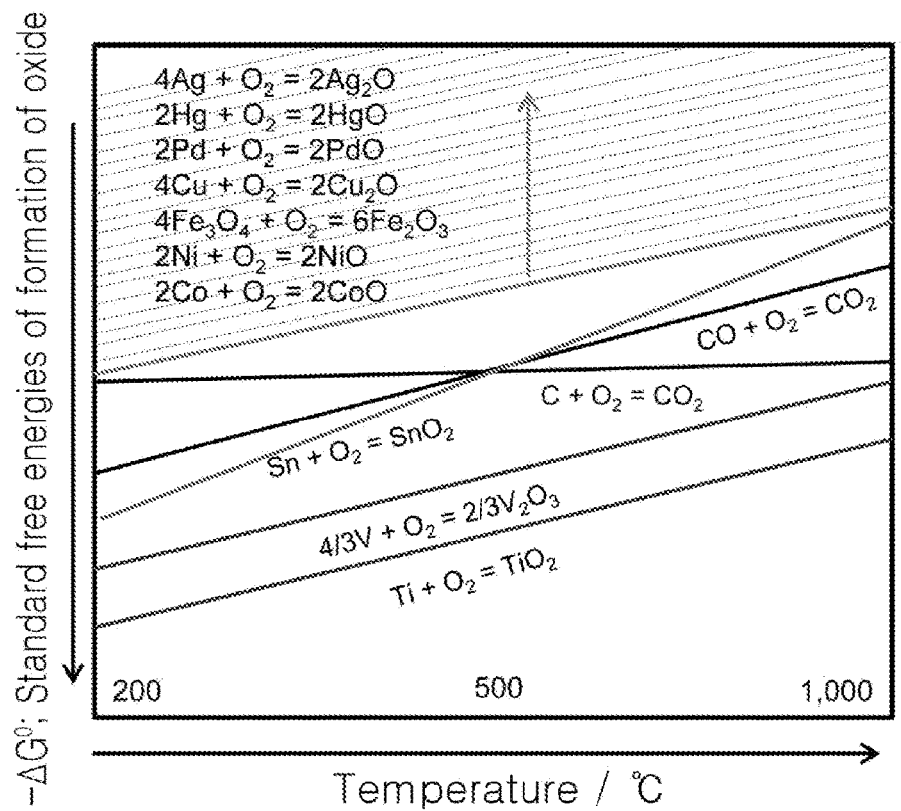
FIG. 5 is a graph obtained by reconstruction of Ellingham diagrams to show theoretical thermodynamic energy values depending upon temperature for oxidation of coal (carbon) and reduction of a metal oxide.

In yet another embodiment, as shown in FIG. 5, the metal oxide may be an oxidation material above a line corresponding to reaction of $Sn+O_2=SnO_2$ in the Ellingham diagrams, that is, a reactant having a smaller absolute value of the negative Gibbs free energy than that in the above reaction. For example, the metal oxide includes at least one selected from among $Ag_2O$, $HgO$, $PdO$, $Cu_2O$, $Fe_2O_3$, $NiO$, and $CoO$, without being limited thereto.

In this way, advantageously, such a recovery system enables not only recovery of ashes or minerals contained in coal into metals, but also recovery of small amounts of high-priced noble metals included therein.

In yet another embodiment, the liquid media may be molten tin. It was confirmed that, when a molten tin electrochemical media was used, final fuel cell performance and metal recovery were significantly improved due to significant increase of oxidation.

In yet another embodiment, the liquid media may further include at least one metal selected from among Sb, Pb, and Bi. That is, in order to optimize reaction temperature and to promote oxygen ion transfer, a metal having a relatively low melting point (M=Sb, Pb, Bi) may be mixed with tin to form a liquid Sn-M media.

In yet another embodiment, the fuel electrode may be yttria-stabilized zirconia (YSZ), the liquid media may be molten tin, and the metal-reductive direct carbon fuel cell may be operated at 600° C. to 1,200° C. As such, the direct carbon fuel cell may be operated at an operating temperature from 600° C. to 1,200° C. in consideration of oxygen ion transfer rate of YSZ, activity of molten tin, and the Gibbs free energy in the Ellingham diagrams.

Although the present invention has been described with reference to some embodiments in conjunction with the accompanying drawings, it should be understood that the foregoing embodiments are provided for illustration only and are not to be construed in any way as limiting the present invention, and that various modifications, changes, alterations, and equivalent embodiments can be made by those skilled in the art without departing from the spirit and scope of the invention.

What is claimed is:

1. A metal-reductive direct carbon fuel cell comprising:
   (a) a housing;
   (b) at least one fuel inlet through which a mixture of a fuel and a metal oxide is injected into the housing;
   (c) at least one unit cell which has a cylindrical shape having an elongated hole formed therein in an axial direction and is rotatably disposed within the housing;
   (d) at least one gas inlet through which an oxygen-containing gas is injected into the hole from an outside of the housing;
   (e) at least one gas outlet through which carbon dioxide generated in the housing is discharged;
   (f) a liquid media filling at least a portion of an empty space within the housing; and
   (g) at least one metal outlet through which a metal reduced from the injected metal oxide by the unit cell is discharged from the housing.

2. The direct carbon fuel cell according to claim 1, wherein the unit cell comprises:
   (c1) a fuel electrode formed on a surface thereof;
   (c2) an air electrode formed on a surface of the hole formed in the axial direction;
   (c3) a fuel electrode current collector contacting at least a portion of a surface of the fuel electrode; and
   (c4) an air electrode current collector contacting at least a portion of a surface of the air electrode.

3. The direct carbon fuel cell according to claim 2, wherein the fuel electrode current collector comprises at least one conductive metal wire contacting the surface of the fuel electrode.

4. The direct carbon fuel cell according to claim 3, wherein the fuel electrode comprises yttria-stabilized zirconia (YSZ), and has a nanoscale thick $TiO_2$ or $V_2O_3$ layer formed on the surface thereof.

5. The direct carbon fuel cell according to claim 4, wherein the fuel electrode comprises a plurality of protrusions on the surface thereof.

6. The direct carbon fuel cell according to claim 1, further comprising:
   an outlet through which the liquid media is discharged from the housing; and
   an inlet through which the liquid media is injected again into the housing.

7. The direct carbon fuel cell according to claim 1, wherein the fuel comprises at least one solid fuel selected from among coal, coke, char and graphite; at least one liquid fuel selected from among gasoline, diesel, heavy oil and kerosene; or a mixture of the solid and liquid fuels.

8. The direct carbon fuel cell according to claim 7, wherein the fuel is a solid fuel pulverized to a size from 0.1 μm to 5 μm.

9. The direct carbon fuel cell according to claim 1, wherein the metal oxide comprises at least one selected from among $Ag_2O$, HgO, PdO, $Cu_2O$, $Fe_2O_3$, NiO, and CoO.

10. The direct carbon fuel cell according to claim 1, wherein the liquid media is molten tin.

11. The direct carbon fuel cell according to claim 10, wherein the liquid media further comprises at least one metal selected from among Sb, Pb, and Bi.

12. The direct carbon fuel cell according to claim 1, wherein the fuel electrode is yttria-stabilized zirconia (YSZ), the liquid media is molten tin, and the metal-reductive direct carbon fuel cell is operated at 600° C. to 1,200° C.

13. The direct carbon fuel cell according to claim 2, wherein the unit cell further comprises:
   (c5) an external wire connecting the air electrode current collector to the fuel electrode current collector through a load.

* * * * *